United States Patent [19]

Garibay, Jr. et al.

[11] Patent Number: 5,479,616
[45] Date of Patent: Dec. 26, 1995

[54] EXCEPTION HANDLING FOR PREFETCHED INSTRUCTION BYTES USING VALID BITS TO IDENTIFY INSTRUCTIONS THAT WILL CAUSE AN EXCEPTION

[75] Inventors: Raul A. Garibay, Jr., Plano; Mark Bluhm, Carrollton, both of Tex.

[73] Assignee: Cyrix Corporation, Richardson, Tex.

[21] Appl. No.: 863,226

[22] Filed: Apr. 3, 1992

[51] Int. Cl.⁶ .................................................. G06F 9/38
[52] U.S. Cl. ..................... 395/375; 364/DIG. 1; 364/DIG. 2; 364/231.8; 364/263.1; 364/263.2
[58] Field of Search ............ 364/DIG. 1 MS File, 364/DIG. 2 MS File; 395/375, 800, 775, 650, 400, 425

[56] References Cited

U.S. PATENT DOCUMENTS 4,747,045  5/1988  Harigai et al. .................... 395/375

*Primary Examiner*—Robert B. Harrell
*Attorney, Agent, or Firm*—Andrew S. Viger; John L. Maxin

[57] ABSTRACT

An exception handling system is used, in an exemplary embodiment, to provide exception handling for prefetched instruction bytes in a pipelined 486-type microprocessor. The microprocessor includes a prefetch unit (22) that controls the loading of a prefetch queue (24), including appending a valid bit to each prefetched instruction byte—this valid bit is conventionally used to notify an instruction decoder (26) that a transferred instruction byte is not valid (such as resulting from a change of flow), causing the decoder to signal a stall condition. According to the exception handling technique of the invention, if the prefetch unit detects that any of a selected number of exception conditions (such as limit violations and page faults) applies to a prefetched instruction byte, it invalidates that instruction byte by clearing the valid bit. When an invalid instruction byte is decoded, the decoder asserts a stall condition that can result from either: (a) the prefetch queue is invalid due to instruction bytes being unavailable or flushing in response to a branch, or (b) an exception condition. An exception processor (30) performs two basic functions: (a) monitoring the prefetch unit, and for any instruction byte for which a potential exception condition exists, storing in an exception status register the associated exception status information (for example, limit violation or page fault), and (b) monitoring the decoder to detect stall conditions. For each stall condition detected, the exception processor checks the exception status register for valid exception status information—if so, it invokes the appropriate exception handling routine. Thus, exception handling occurs at decode time, rather than after execution (requiring instruction abort and side effect handling).

11 Claims, 2 Drawing Sheets

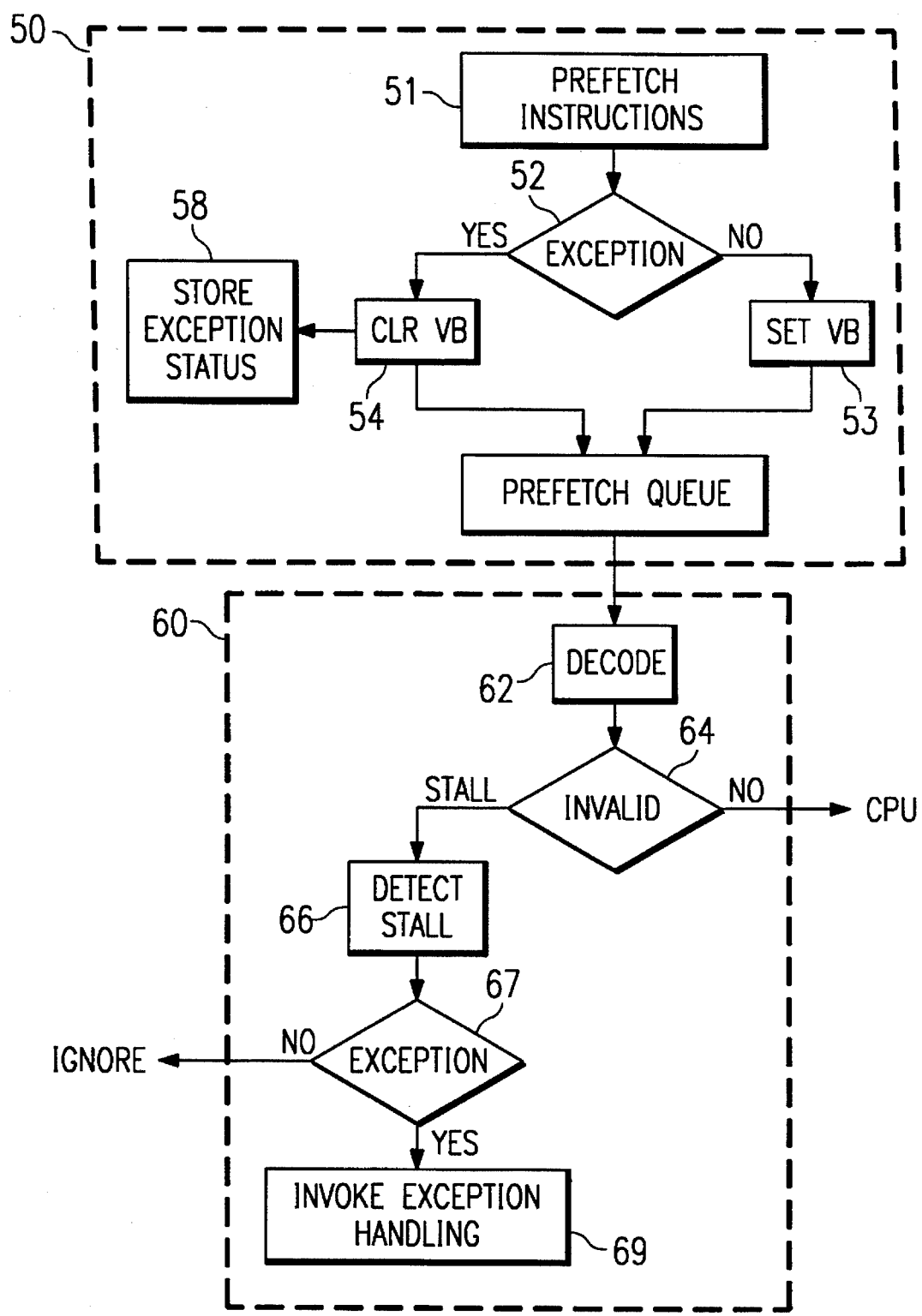

EXCEPTION HANDLING FOR PREFETCHED INSTRUCTION BYTES USING VALID BITS TO IDENTIFY INSTRUCTIONS THAT WILL CAUSE AN EXCEPTION

CROSS-REFERENCE TO RELATED APPLICATION

This application is related to a co-pending U.S. patent application Ser. No. 07/863,227, titled "Design and Method for Implementing Shift-Based Access Control For a Sequential Data Buffer", filed Apr. 3, 1992, and assigned to the assignee of this application.

BACKGROUND OF THE INVENTION

1. Technical Field

The invention relates generally to electrical computers and data processing systems (Class 364), and more particularly to instruction prefetch and interrupt (Subclasses 263.1 and 263.2). In even greater particularity, the invention relates to exception handling for prefetched instruction bytes using valid bits to identify instructions that will cause an exception.

2. Related Art

Instruction prefetch is commonly used in microprocessors to optimize computer execution time. Instructions prefetched from main memory or cache are stored in an instruction prefetch queue for input to the instruction decoder.

Without limiting the scope of the invention, this background information is provided in the context of a specific problem to which the invention has application: exception handling for prefetched instructions.

Computer architectures commonly use exceptions to signal the detection of an error condition before, during or after execution of an instruction. Exception logic monitors each instruction retrieved from memory to determine whether an exception should be signaled, and stores the addresses of those instruction bytes that may potentially cause an exception. Each exception has associated with it a vector used to locate a corresponding exception handling routine.

In response to the execution of an instruction that causes an exception, program execution is interrupted, and the computer system vectors to a corresponding exception handling routine. Exceptions may be categorized based on how the exception is reported, and how the associated exception handling routine returns to the program: (a) faults are reported for the next instruction, and the return is to the faulting instruction which is reexecuted, (b) traps are reported immediately after the execution of the instruction that caused the exception, and the return is to the instruction after the instruction that caused the trap, and (c) aborts occur as a result of system errors, and generally require restart.

For example, in the case of the 386 architecture, exceptions that may be asserted include: Debug, Invalid Op code, Coprocessor Extension Not Available, Coprocessor Error, Stack Fault, Page Fault, Segment Not Present, and Limit Violation.

Instruction prefetch speculatively fills the prefetch queue with instruction bytes that, because of changes of flow (such as branching), may not actually be executed. Since an exception may be asserted for any of the prefetched instruction bytes, the computer system must implement a technique for identifying instruction bytes in the execution stream that may cause an exception so that the appropriate exception handling routine can be invoked.

One exception handling technique is to include an exception bit with each instruction byte placed in the prefetch queue—if an exception condition is detected, prefetch logic sets the exception bit for the associated instruction byte placed in the prefetch queue. The decoder includes logic for testing the exception bit for each instruction byte decoded for execution, and for invoking the appropriate exception handling routine. This technique is disadvantageous in that it adds to decoder complexity by requiring it to implement exception handling.

Another exception handling technique is to keep track of the address of the instruction being currently decoded for execution. Exception logic compares each instruction address with those addresses identified as potentially causing an exception—if a match is detected, the appropriate exception handling routine is invoked. This technique is disadvantageous in that delaying exception detection until after decode means that exception handling will be invoked later in the instruction pipe, requiring instruction execution to be aborted, and related side effects dealt with.

Accordingly, a specific need exists for an improved exception handling technique for prefetched instructions.

SUMMARY OF THE INVENTION

The invention is a design and method for implementing exception handling for prefetched instruction bytes placed in a prefetch queue, where each instruction byte has associated with it a valid bit. The valid bit is normally used to notify an instruction decoder that a transferred instruction byte is not valid, which causes the decoder to stall, either because prefetched instruction bytes are not available, or because of change of program flow caused by an unconditional jump (i.e., jump, call, return, etc.) or conditional branch taken.

In one aspect of the invention, the exception handling technique involves: (a) for instruction bytes that will potentially cause one of a selected number of exceptions, clearing the valid bit prior to the instruction byte being presented to the instruction decoder, thereby indicating an invalid instruction byte; (b) maintaining exception status information for any instruction bytes in the prefetch queue invalidated because of an exception condition; (c) signaling a stall condition when such invalid instruction byte is decoded; and (d) in response to a stall condition, determining whether that stall condition results from an exception condition, and if so, causing the appropriate exception handling routine to be invoked.

In another aspect of the invention, the exception handling logic includes prefetch logic and exception logic. The prefetch logic initiates memory accesses to retrieve instruction bytes from memory, and determines whether any of a selected number of exceptions applies to any instruction byte. If so, the prefetch logic (a) stores the instruction byte in the prefetch queue with the valid bit clear to indicate an invalid instruction byte, and (b) provides exception status information to the exception logic to identify the exception.

When the instruction decoder decodes an invalid instruction byte, it signals a stall condition (without regard to whether the valid bit was cleared as a result of an exception condition). The exception logic detects the stall condition, and determines whether that stall condition results from an exception condition. If so, it causes the appropriate exception handling routine to be invoked.

In an exemplary embodiment of the invention, the prefetch logic is part of a prefetch unit of a microprocessor with internal instruction/data cache. The exception handling technique of the invention is used in connection with limit violation and page fault exceptions detected by the prefetch unit.

An internal exception processor (a) monitors the exception status information from the prefetch unit, and (b) stores in an exception status register exception status information if an instruction byte is placed in the prefetch queue that has been invalidated because of an exception condition. When the exception processor detects that the decoder has asserted a stall condition, it determines whether the stall resulted from an attempt to decode an instruction byte which has been invalidated in the prefetch queue due to the detection of an exception condition (i.e., whether it has exception status information for that invalid instruction in its exception status register), and if so, it invokes the appropriate exception handling routine (i.e., page fault or limit violation based on the exception status information).

The technical advantages of the invention include the following. The exception handling design implements exception handling for prefetched instructions in a manner that does not require the use of a special exception bit, or the associated redesign of decoder logic to test for such bit and implement exception handling. Exception detection occurs at decode time, enabling exception handling to be invoked prior to execution of the instruction, thereby avoiding having to abort instruction execution and deal with any side effects.

For a more complete understanding of the invention, and for further features and advantages, reference is now made to the following Detailed Description of an exemplary embodiment of the invention, together with the accompanying Drawings.

BRIEF DESCRIPTION OF THE DRAWINGS

FIG. 2 is a flow diagram illustrating the method of exception handling prefetched instructions according to the invention.

DETAILED DESCRIPTION OF THE INVENTION

Figure 1:
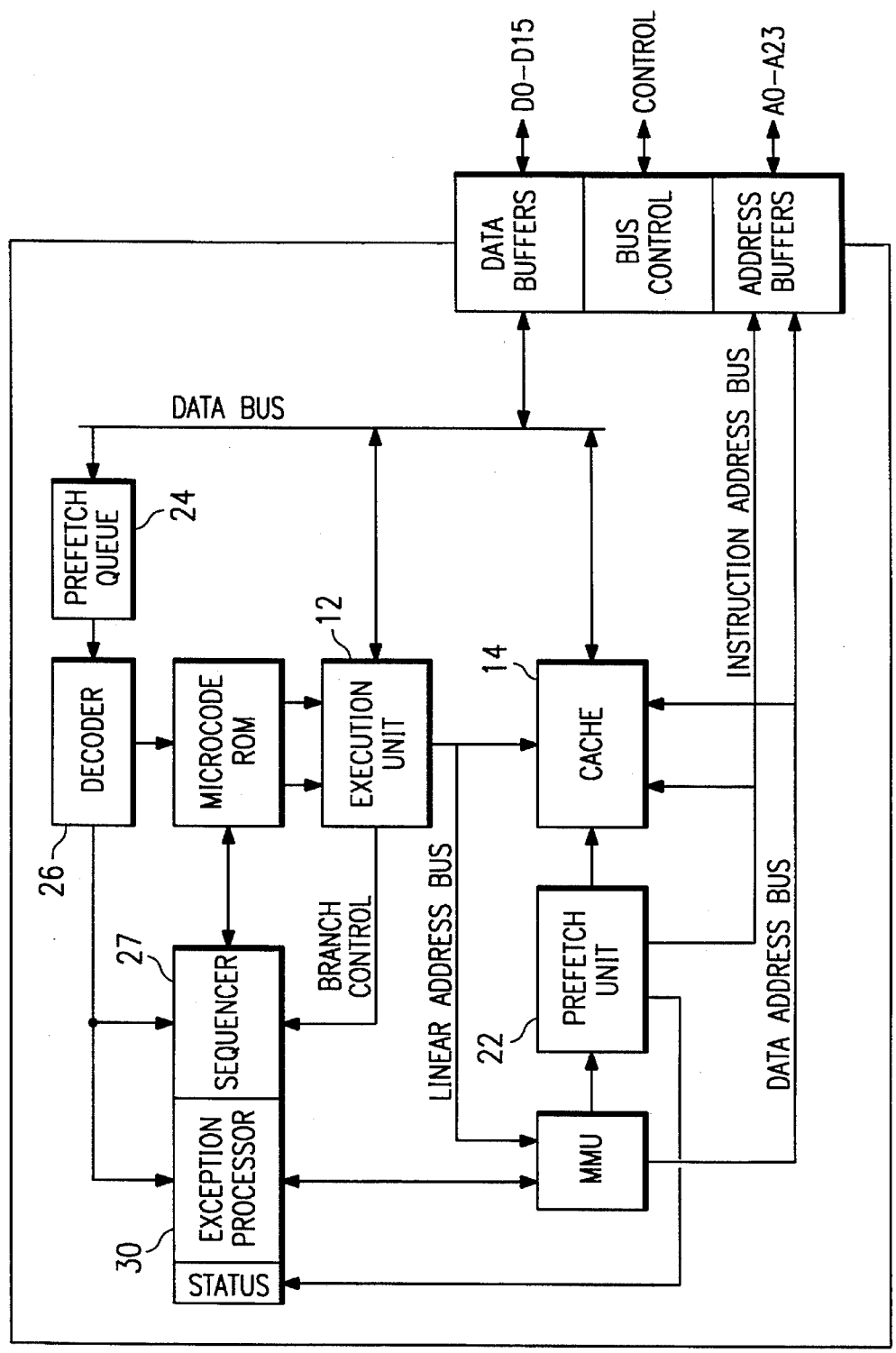
FIG. 1 is a general block diagram illustrating a microprocessor including a prefetch unit and an exception processor for implementing exception handling for selected prefetched instruction bytes according to the invention.

The detailed description of an exemplary embodiment of the design and method for exception handling for prefetched instruction bytes using valid bits is organized as follows:

1. Exception Handling Using Valid Bits
1.1. Instruction Prefetch
1.2. Exception Handling
2. Conclusion The exemplary exception handling design and method is implemented in a 32-bit microprocessor based on the x86 instruction set.

1. Exception Handling for Prefetched Instructions. FIG. 1 illustrates the exemplary microprocessor shown generally at 10. The microprocessor includes an execution unit 12 with onboard unified (instruction and data) cache memory 14.

Instruction prefetch logic includes a prefetch unit 22 and a prefetch queue 24. The prefetch unit fetches instruction bytes either (a) from cache 12, or (b) from the external memory system (not shown), over an instruction address bus. The prefetched instruction bytes are sent to the prefetch queue.

Instruction bytes in the prefetch queue are presented to an instruction decoder 26 for decoding and input to the execution unit 12 for execution under control of a microsequencer 27. The prefetch queue, or buffer, includes buffer control logic that in response to a bytes-used code from the decoder, increments through the prefetch queue, and in the exemplary embodiment, transfers four instruction bytes at a time to the decoder.

For each prefetched instruction byte placed into the prefetch queue 24, the prefetch unit 22 appends a valid bit. The prefetch unit sets the valid bit to indicate a valid instruction byte, and clears the valid bit to indicate an invalid instruction byte.

The valid bit has two functions. In response to a change of flow (such as an unconditional jump or a conditional branch taken), the execution unit 12 flushes the prefetch queue 24 by clearing the valid bits for all instruction bytes in the queue. In addition, instruction bytes in the prefetch queue for which an exception condition has been detected are also invalidated.

In accordance with the exception handling technique of the invention, if the prefetch unit 22 detects that any of a selected number of exception conditions applies to a prefetched instruction byte, it invalidates that instruction byte by clearing the valid bit. For the exemplary embodiment, the exceptions that are handled by this exception handling technique are: limit violations and page faults.

When an invalid instruction byte is presented to the decoder 26, it asserts a stall condition to advise the execution unit 12 that valid instructions are not available. Again, this stall condition can result from either (a) the prefetch queue being flushed in response to a branch condition, or (b) and exception condition. In the latter case, the appropriate exception handling routine must be invoked to handle the exception prior to resuming program execution.

An exception processor 30 implements exception handling in connection with the prefetch logic (prefetch unit 22 and prefetch queue 24).

For the specified exceptions, the prefetch unit 22 includes logic to test each prefetched instruction byte and to determine when an instruction byte will cause an exception if it is executed. If the prefetch unit detects an exception condition, it (a) signals exception status information identifying the exception (i.e., page fault or limit violation) to the exception processor, and (b) sends the corresponding instruction byte to the prefetch queue 24 without setting the valid bit (i.e., the valid bit is clear), thereby indicating an invalid instruction byte. After detecting an exception condition, the prefetch unit stops fetching instruction bytes, waiting for either a return from a vectored transfer to an exception handling routine, or a change of flow away from the instruction byte for which the exception condition was detected.

The exception processor 30 performs two basic functions in accordance with the invention.

First, the exception processor monitors the prefetch unit, and for any instruction byte for which a potential exception condition exists, stores in an exception status register the associated exception status information (i.e., limit violation or page fault) signaled by the prefetch unit.

Second, the exception processor monitors the decoder 26, and detects stall conditions. For each stall condition detected, the exception processor checks the exception status register for valid exception status information. The exception processor indicates whether an exception condition exists for the instruction byte that resulted in the stall condition.

If so, it invokes exception handling by providing the sequencer 27 with the appropriate vector for the exception handling routine in the microcode store. It should be noted that if a stall condition results from a change of flow away from an instruction byte in the prefetch queue for which an exception condition was detected, the associated exception status information sent to the exception processor will be cleared as a result of a change of flow, so that the exception processor will not signal an exception condition because the instruction byte for which the exception was detected was speculatively prefetched and will not be executed at the current time.

The prefetch queue 24 and the decoder 26 may be of conventional design. For the exemplary embodiment, the prefetch queue is implemented with shift-based buffer control logic described in the related application. For the exemplary 32-bit architecture, the prefetch queue is a circular buffer of 16 bytes corresponding to four 4 byte lines of the internal cache. Instructions are of variable length, so that instructions in the prefetch queue will be misaligned— the buffer control logic for the prefetch queue will transfer to the decoder 4 bytes at a time.

FIG. 2 illustrates the exception handling technique of the invention. The exception handling technique involves two basic functions: (a) instruction prefetch (50), including using the valid bit to indicate exception conditions, and (b) exception handling (60), including invoking exception handling routines in response to exception conditions.

1.1. Instruction Prefetch. During instruction prefetch operations (50), instruction bytes are prefetched (51) by the prefetch unit from the cache, or in the case of a read miss, from external memory.

For each instruction byte fetched, the prefetch unit determines (52) whether a potential exception condition exists. If the prefetched instruction byte will not cause any of the specified exceptions (i.e., limit violation or page fault) if executed, then the valid bit for that instruction byte is set (54). If, however, the prefetched instruction byte will cause an exception if executed, then the valid bit for that instruction byte is not set (54), and the prefetch unit signals the exception condition by providing exception status information to the exception processor.

The instruction byte with its associated valid bit are then sent to the prefetch queue (56), and the prefetch unit stops prefetching operations.

The exception processor monitors the prefetch unit, and when an exception condition is signaled, stores (58) the associated exception status information in its exception status register.

1.2. Exception Handling. During exception handling operations (60), instruction bytes in the prefetch queue are presented to the instruction decoder (62), for decoding.

The decoder tests (64) the valid bit for each instruction byte. If the valid bit is set, the decoding operation proceeds normally. If the valid bit is not set, the decoder recognizes the instruction byte as being invalid, and asserts a stall condition. At this point, it has not been determined whether the stall condition results from an exception condition, or from a change of flow that has resulted in the prefetch queue being invalidated.

The exception processor detects (66) the stall condition, and checks (67) the exception status register for associated exception status information to determine whether the stall condition resulted from an exception condition. If an exception condition is indicated by the presence of valid exception status information, the exception processor invokes (69) exception handling by vectoring to the appropriate exception handling routine.

2. Conclusion. Although the Detailed Description of the invention has been directed to certain exemplary embodiments, various modifications of these embodiments, as well as alternative embodiments, will be suggested to those skilled in the art. For example, instead of directly invoking exception handling routines, the exception processor could merely identify the exception condition to the CPU, which could then control exception handling. Moreover, the division of functions between the prefetch logic and exception processor is made for the purposes of this Detailed Description of an exemplary embodiment, and is not intended to be limiting.

It is to be understood that the invention encompasses any modifications or alternative embodiments that fall within the scope of the appended claims.

What is claimed is:

1. In a processor including a prefetch unit for prefetching instruction bytes from a memory into a prefetch queue, where a valid bit is associated with each prefetched instruction byte in the prefetch queue such that, when that prefetched instruction byte is decoded, a stall condition will be signaled, an exception handling system using the valid bits prefetched instruction bytes in the prefetch queue to identify instructions that will potentially cause an exception comprising:

prefetch logic including exception detection logic that determines, for prefetched instruction bytes, whether any of a selected number of exception conditions applies to any such prefetched instruction byte;

if an exception condition is detected, the prefetch logic stores the corresponding prefetched instruction byte in the prefetch queue with the valid bit for such prefetched instruction byte indicating that it is invalid, and provides corresponding exception status information identifying the exception condition associated with such prefetched instruction byte; and exception logic that monitors the prefetch logic, and stores exception status information;

in response to a stall condition signaled during decode of one of the prefetched instruction bytes, the exception logic detects the stall condition, and determines whether that stall condition results from an exception condition associated with such prefetched instruction byte by checking the stored instruction status information;

if the stall condition resulted from an exception condition, the exception logic causes an associated exception handling routine to be invoked.

2. The exception handling system of claim 1, wherein the selected number of exception conditions includes page faults and limit violations.

3. The exception handling system of claim 1, wherein the exception logic invokes the exception handling routine directly.

4. The exception handling system of claim 1, wherein the exception logic includes an exception status register for storing exception status information.

5. For a processor including a prefetch unit for prefetching instruction bytes from a memory into a prefetch queue, where a valid bit is associated with each prefetched instruction byte in the prefetch queue such that, when that prefetched instruction byte is decoded, a stall condition will be signaled, a method of exception handling using the valid bits of prefetched instruction bytes in the prefetch queue to identify instructions that will potentially cause an exception, comprising the steps:

detecting, for prefetched instruction bytes, whether any of a selected number of exception conditions applies to any such prefetched instruction byte;

if an exception condition is detected, storing the corresponding prefetched instruction byte in the prefetch queue with the valid bit for such prefetched instruction byte indicating that it is invalid, and providing corresponding exception status information identifying the exception condition associated with such prefetched instruction byte;

monitoring the exception status information;

in response to a stall condition signaled during decode of one of the prefetched instruction bytes, determining whether that stall condition results from an exception condition associated with such prefetched instruction byte by checking associated instruction status information; and if the stall condition resulted from an exception condition, invoking an associated exception handling routine.

6. The exception handling method of claim 5, wherein the selected number of exception conditions includes page faults and limit violations.

7. The exception handling method of claim 5, wherein the step of providing corresponding exception status information is accomplished by storing exception status information in an exception status register.

8. In a processor including a prefetch unit for prefetching instruction bytes from a memory into a prefetch queue, where a valid bit is associated with each prefetched instruction byte in the prefetch queue such that, when that prefetched instruction byte is decoded, a stall condition will be signaled, an exception handling system using the valid bits of prefetched instruction bytes in the prefetch queue to identify instructions that will potentially cause an exception, comprising:

prefetch means including exception detection means for determining, for prefetched instruction bytes, whether any of a selected number of exception conditions applies to any such prefetched instruction byte;

if an exception condition is detected, the prefetch means stores the corresponding prefetched instruction byte in the prefetch queue with the valid bit for such prefetched instruction byte indicating that it is invalid, and provides corresponding exception status information identifying the exception condition associated with such prefetched instruction byte; and exception means for monitoring the prefetch logic, and for storing exception status information;

in response to a stall condition signaled during decode of one of the prefetched instruction bytes, the exception means detects the stall condition, and determines whether that stall condition results from an exception condition associated with such prefetched instruction byte by checking the stored instruction status information;

if the stall condition resulted from an exception condition, the exception means causes an associated exception handling routine to be invoked.

9. The exception handling system of claim 8, wherein the selected number of exception conditions includes page faults and limit violations.

10. The exception handling system of claim 8, wherein the exception means invokes the exception handling routine directly.

11. The exception handling system of claim 8, wherein the exception means includes an exception status register for storing exception status information.

* * * * *